United States Patent [19]

Kim

[11] Patent Number: 5,691,971
[45] Date of Patent: Nov. 25, 1997

[54] MULTIPLE RECORDING LAYER FOCUSING OF A LIGHT SPOT WITH AN ADDITION OF ZOOM LENS

[75] Inventor: Jong-ryull Kim, Kwangmyung, Rep. of Korea

[73] Assignee: SamSung Electronics Co., Ltd., Kyungki-Do, Rep. of Korea

[21] Appl. No.: 628,328

[22] Filed: Apr. 5, 1996

[30] Foreign Application Priority Data

Apr. 13, 1995 [KR] Rep. of Korea .................. 95-8719

[51] Int. Cl.$^6$ ................................ G11B 7/09
[52] U.S. Cl. .................. 369/112; 369/44.23; 369/44.14
[58] Field of Search ..................... 369/44.37, 44.23, 369/100, 112, 110, 120, 32, 94, 44.14, 44.24; 359/319, 256, 316, 558, 676, 823

[56] References Cited

U.S. PATENT DOCUMENTS 4,376,303  3/1983  Lurie .................................. 369/112
4,783,152  11/1988 Nishimoto ......................... 369/110
5,251,198  10/1993 Strickler ............................ 369/94
5,414,451  5/1995  Sugiyama et al. ................. 369/112
5,499,231  3/1996  Fennema et al. .................. 369/94
5,526,336  6/1996  Park et al. .......................... 369/94

*Primary Examiner*—David C. Nelms
*Assistant Examiner*—Kim-Kwok Chu
*Attorney, Agent, or Firm*—Sughrue, Mion, Zinn, Macpeak & Seas, PLLC

[57] ABSTRACT

An optical pickup apparatus for an optical disk having multiple recording layers. Said apparatus includes a fixed optical system for emitting light toward the optical disk and receiving light reflected from the optical disk, a spot forming device for focusing light emitted from the fixed optical system to form a beam spot on the optical disk, and a spot zooming device for zooming the beam spot formed by the spot forming means onto a desired recording layer selected from the multiple recording layers of the optical disk.

8 Claims, 3 Drawing Sheets

MULTIPLE RECORDING LAYER FOCUSING OF A LIGHT SPOT WITH AN ADDITION OF ZOOM LENS

BACKGROUND OF THE INVENTION

1. Field of the Invention

The present invention relates to an optical pickup apparatus for an optical disk having multiple recording layers, and more particularly, to an optical pickup apparatus for an optical disk having multiple recording layers, which selectively radiates light on each recording layer to record/reproduce information on/from the optical disk.

2. Description of the Related Art

An optical disk having multiple recording layers which are formed by superimposing two or more recording layers on which information are recorded respectively, and an optical pickup apparatus for reading out information recorded on such an optical disk are well known. Generally, this optical pickup apparatus reads out information recorded on each recording layer by simultaneously scanning the recording layers.

As an example, an optical structure of a conventional optical pickup apparatus for an optical disk having dual recording layers is shown in FIG. 1.

Referring to FIG. 1, a parallel beam 3 emitted from a fixed optical system 1 passes through a Fresnel lens 5 which is a diffraction element and then falls incident on an objective lens 7. Thus, a plurality of diffracted beams passed through the Fresnel lens 5 fall incident on the objective lens 7, so that beam spots are formed respectively on each recording layer of an optical disk 20.

The beam reflected from each recording layer of the optical disk 20 is directed toward the fixed optical system i via the objective lens 7 and the Fresnel lens 5, and detected as an electrical signal by a photodetector (not shown) provided in the fixed optical system 1.

In the conventional optical pickup as described above, the Fresnel lens 5 and the objective lens 7 are jointly mounted in a lens vessel 9. A focus driving coil 11 is attached to both sides of the lens vessel 9 and permanent magnets 13 for generating magnetic flux are arranged on the exterior of the focus driving coil 11. The focus driving coil 11 moves along an 10 optical axis (indicated as a single-dotted and single-dashed line) together with the lens vessel 9 in a response to a focus error signal generated by the fixed optical system 1. That is, the objective lens 7 is driven together with the Fresnel lens 5 by the focus driving coil 11 to compensate for a focusing error of the objective lens 7 with respect to the optical disk 20, which is caused due to the vertical vibration of the optical disk 20.

In this structure where the Fresnel lens 5 is driven together with the objective lens 7, since two beam spots respectively formed on each recording layer of the optical disk 20 move together, a constant interval is maintained between the beam spots. The interval between two recording layers of the optical disk 20, however, is varied due to variations in the thickness of the recording layers caused by molding imperfections or deformation of the optical disk 20, such as warpage.

Thus, in the above-described conventional optical pickup, the focal positions of beam spots formed on the multiple recording layers of the optical disk cannot be adjusted precisely.

SUMMARY OF THE INVENTION

It is an object of the present invention to provide an optical pickup apparatus for an optical disk having multiple recording layers in which beam spots are selectively formed on each recording layer so that the focal position of each beam spot formed on the respective recording layers can be adjusted precisely and independently.

To achieve the above object of the present invention, there is provided an optical pickup apparatus for an optical disk having multiple recording layers comprising: a fixed optical system for emitting light toward the optical disk and receiving light reflected from the optical disk; spot forming means for focusing light emitted from the fixed optical system to form a beam spot on the optical disk; and spot zooming means for zooming the beam spot formed by the spot forming means onto a selected recording layer selected of the optical disk.

BRIEF DESCRIPTION OF THE DRAWINGS

The above object and advantages of the present invention will become more apparent from the following description of preferred embodiments thereof with reference to the attached drawings in which.

DETAILED DESCRIPTION OF THE PREFERRED EMBODIMENT

Figure 1:
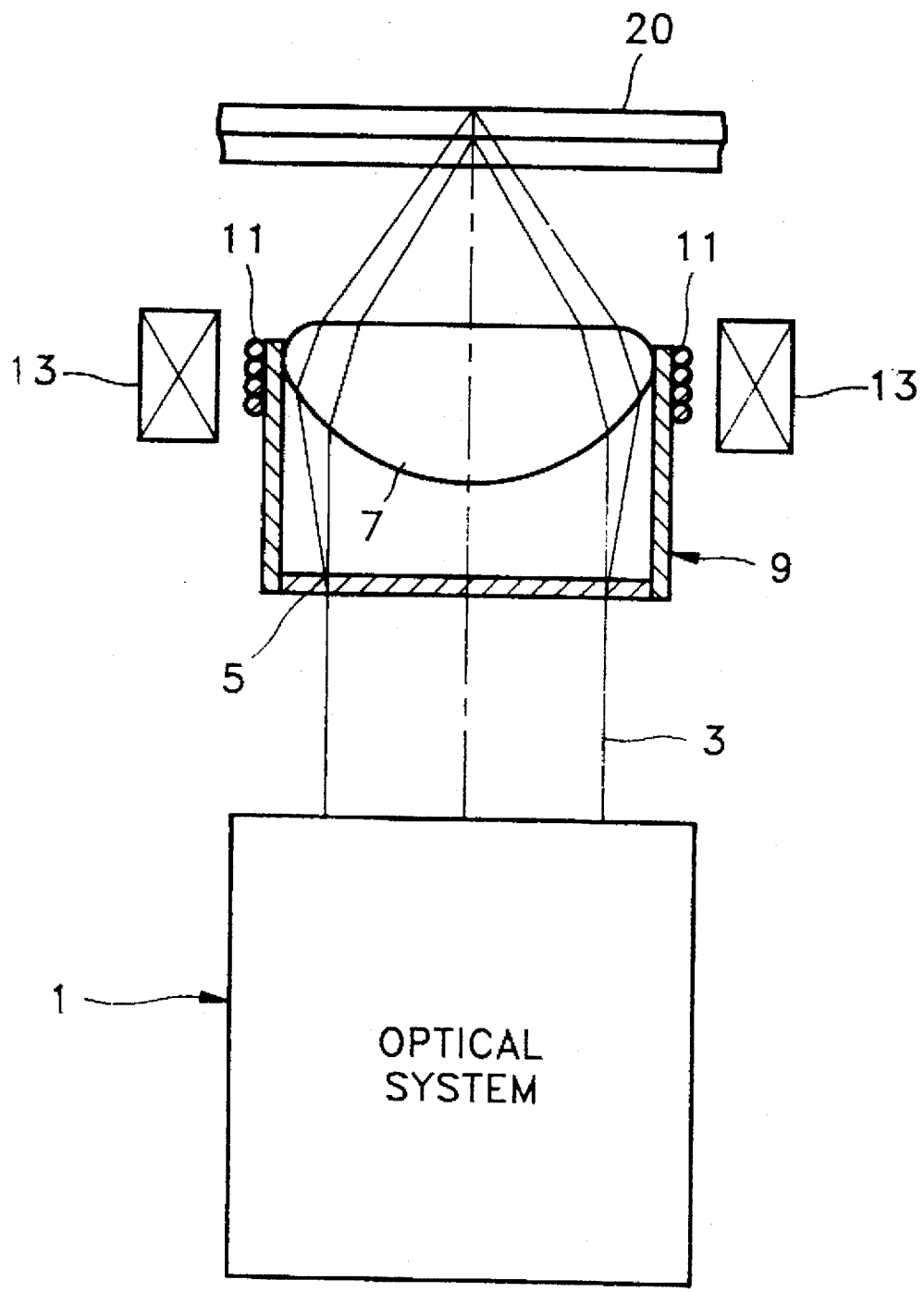
FIG. 1 illustrates an optical structure of a conventional optical pickup apparatus for an optical disk having dual recording layers.
Figure 2:
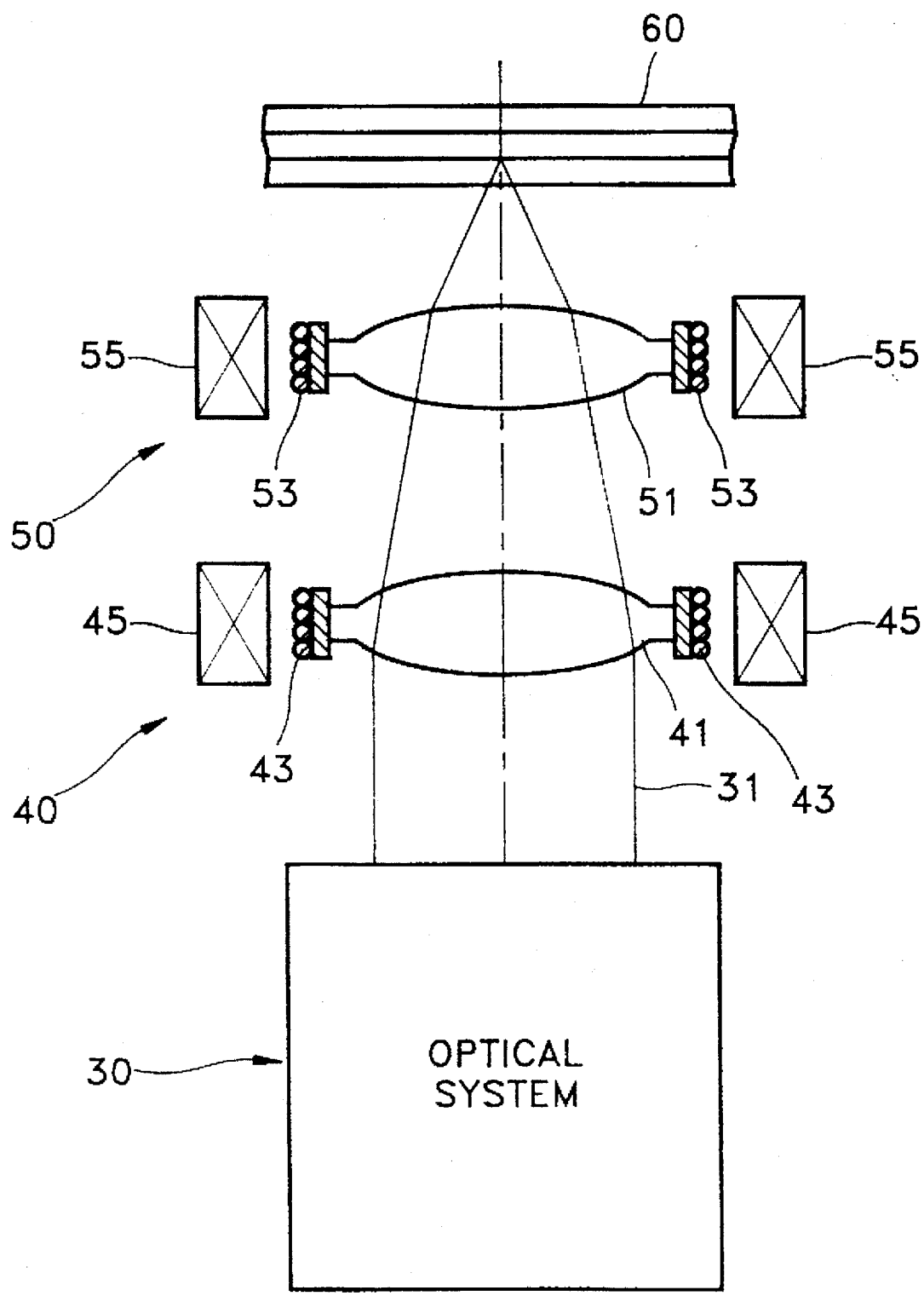
FIG. 2 illustrates an optical structure of an optical pickup apparatus for an optical disk having multiple recording layers according to a first preferred embodiment of the present invention.

As shown in FIG. 2, the optical pickup apparatus for an optical disk having multiple recording layers according to a first preferred embodiment of the present invention includes a fixed optical system 30, a spot forming portion 50 for focusing a beam 31 emitted from the fixed optical system 30 to form a beam spot on the recording layer of an optical disk 60, and a spot zooming portion 40 located between the fixed optical system 30 and the spot forming portion 50, for selectively zooming the beam spot onto a particular recording layer among the multiple recording layers of the optical disk 60.

The fixed optical system 30 includes an optical source, a photodetector and a light path changing device which are commonly used in a general optical pickup apparatus and which are well known to those of skill in the art. Therefore, a detailed description of the fixed optical system 30 will be omitted.

The convergence/divergence degree of the beam emitted from the fixed optical system 30 may be limited according to the beam convergence degree of the spot forming portion 50 and the spot zooming portion 40. Preferably, the fixed optical system 30 emits a collimated beam.

The spot forming portion 50 includes an objective lens 51, a first driving coil 53 and a first magnet 55. The objective lens 51 converges the beam emitted from the fixed optical system 30 to form a beam spot on a recording layer of the optical disk 60 in the same manner as an objective lens used in a conventional optical pickup apparatus for a single-layered optical disk. The first driving coil 53 is attached around the objective lens 51 and the first magnet 55 is fixed to a frame of the device and separated from the first driving coil 53 by a predetermined distance. It is preferable that the first magnet 55 is a permanent magnet. When current is applied to the first driving coil 53, an electromagnetic force is produced between the first driving coil 53 and the first magnet 55, and the first driving coil 53 and the objective lens 51 slightly move against a biasing force along the optical axis due to the electromagnetic force in a known manner.

The first driving coil 53 is for focusing the beam spot and is thus electrically connected to a photodetector of the fixed optical system 30 to move the objective lens 51 to a predetermined position for compensating for a focus error signal and a tracking error signal detected by the photodetector in a known manner.

The spot zooming portion 40 includes a zoom lens 41, a second driving coil 43 and a second magnet 45. The zoom lens 41 has positive refraction characteristics and is installed to be moveable along the optical axis. The second driving coil 43 is attached around the zoom lens 41 and the second magnet 45 is fixedly installed on the frame and is separated from the second driving coil 43 by a predetermined distance. It is preferable that the second magnet 45 is a permanent magnet also.

When a recording layer of the optical disk 60, on/from which information is to be recorded/reproduced, is selected, a predetermined value of current is applied to the second driving coil 43. Due to this applied current, an electromagnetic force is produced between the second driving coil 43 and the second magnet 45. Then, the second driving coil 43 and the zoom lens 41 move against a biasing force along the optical axis (indicated as a single-dotted and single-dashed line) due to the electromagnetic force generated between the second driving coil 43 and the second magnet 41. The magnitude of the applied current is determined in advance to move the zoom lens 41 to an intended position along the optical axis. Therefore, spot zooming portion 40 is used to selectively zoom a spot to a desired layer while spot forming portion 50 is used to focus the spot and correct for focusing error due to movement and warpage of the disk.

Figure 3:
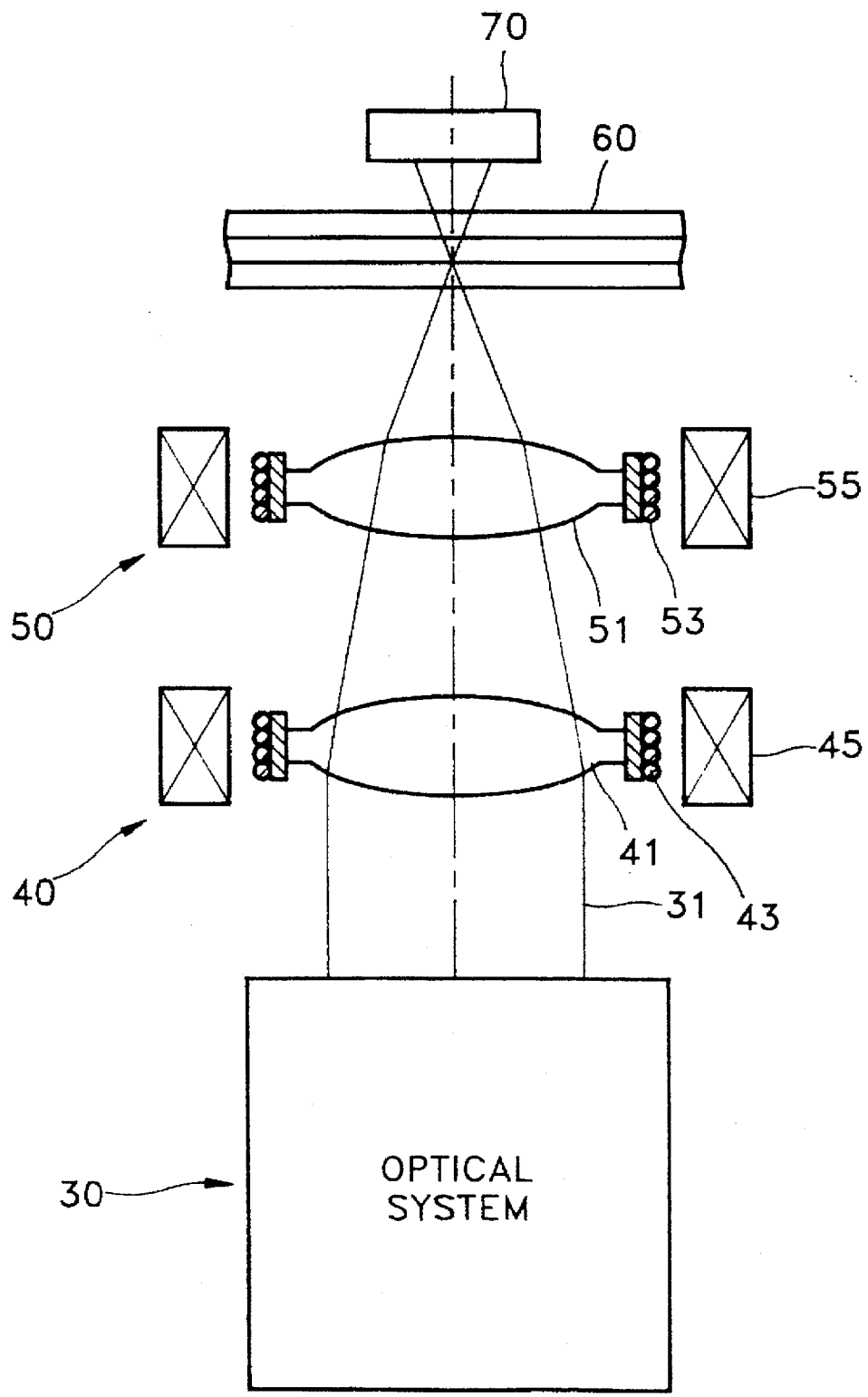
FIG. 3 illustrates an optical structure of an optical pickup for an optical disk having multiple recording layers according to a second preferred embodiment of the present invention.

An optical pickup apparatus for an optical disk having multiple recording layers according to a second preferred embodiment of the present invention will be described below with reference to FIG. 3.

The optical pickup apparatus of the second embodiment includes the fixed optical system 30, the spot forming portion 50 and the spot zooming portion 40, similar to the optical pickup apparatus of the first embodiment illustrated in FIG. 2. The construction and operation of these constituent members are the same as described above and thus further description thereof will be omitted.

On the other hand, the optical pickup apparatus according to the second preferred embodiment further includes a sensing portion 70 installed at the rear of the optical disk 60. The sensing portion 70 detects the size of a beam spot formed on the optical disk 60 to determine a recording layer on which the optical spot is formed. The sensing portion 70 is fixedly installed at the rear of the optical disk 60, and is separated from the optical disk 60 by a predetermined distance. The sensing portion 70 receives light which has passed through the recording layers of the optical disk 60 after being emitted from the fixed optical system 30. The spot size of the received beam varies according to which one of the layers of the optical disk 60 that the beam spot is formed on. In other words, the image received by sensing portion 70 is larger if the layer on which the spot is focused is farther away from the sensing portion 70. Sensing portion 70 can be calibrated in a predetermined manner to distinguish between the layers. Thus, the sensing portion 70 can determine a recording layer on/from which information is being recorded/reproduced by using the spot size of the received beam.

The sensing portion 70 detects the change in the spot size of the detected beam and feedbacks the detected result to the spot forming portion 50 and/or the spot zooming portion 40, so that the focusing precision and position of the beam spot formed on the recording layer of optical disk 60 can be controlled.

As described above, the optical pickup apparatus for the optical disk having multi-recording layers has a zoom function to selectively form a beam spot on each recording layer, so that the focal position of the beam spot can be adjusted precisely. The various operations of the embodiments disclosed above can be controlled by known programmable control devices, such as microprocessor-based controllers, and known sensors. Also, the data read by or recorded by the pickup apparatus can be processed and generated in a conventional manner.

What is claimed is:

1. An optical pickup apparatus for an optical disk, the optical disk having multiple recording layers, said apparatus comprising:

a fixed optical system for emitting light toward the optical disk and receiving light reflected from the optical disk;

means for focusing light emitted from said fixed optical system to form a beam spot on the optical disk; and means for zooming the beam spot formed by said means for focusing onto a desired recording layer selected from among the multiple recording layers of the optical disk.

2. An optical pickup apparatus for an optical disk as claimed in claim 1, wherein said means for focusing comprises:

an objective lens located between said fixed optical system and the optical disk, for focusing the light;

a first driving coil coupled to said objective lens; and a first magnet separated from said first driving coil by a predetermined distance.

3. An optical pickup apparatus for an optical disk as claimed in claim 2, further comprising:

sensing means installed on a side of the optical disk which is opposite to said fixed optical system, said sensing means detects the size of a beam which is emitted from said fixed optical system after the beam has passed through the optical disk to determine which one of the recording layers of the optical disk a beam spot is formed on.

4. An optical pickup apparatus for an optical disk as claimed in claim 2, wherein said means for zooming comprises:

a zoom lens installed to be movable along a path of the light, said zoom lens having a positive refraction characteristic;

a second driving coil coupled to said zoom lens; and a second magnet separated from said second driving coil by a predetermined distance.

5. An optical pickup apparatus for an optical disk as claimed in claim 4, further comprising:

sensing means installed on a side of the optical disk which is opposite to said fixed optical system, said sensing means detects the size of a beam which is emitted from said fixed optical system after the beam has passed through the optical disk to which one of the recording layers of the optical disk a beam spot is formed on.

6. An optical pickup apparatus for an optical disk as claimed in claim 1, wherein said means for zooming comprises:

a zoom lens installed to be movable along a path of the light, said zoom lens having a positive refraction characteristic;

a second driving coil coupled to said zoom lens; and a second magnet separated from said second driving coil by a predetermined distance.

7. An optical pickup apparatus for an optical disk as claimed in claim 6, further comprising:

sensing means installed at the rear of the optical disk, which detects the size of beam which is emitted from said fixed optical system and then passes through the optical disk to determine a recording layer of the optical disk on which a beam spot formed.

8. An optical pickup apparatus for an optical disk as claimed in claim 1, further comprising:

sensing means installed on a side of the optical disk, which is opposite to said fixed optical system, said sensing means detects the size of a beam which is emitted from said fixed optical system after the beam has passed through the optical disk to determine which one of the recording layers of the optical disk a beam spot is formed on.

* * * * *